United States Patent

[11] 3,628,720

[72] Inventor Herbert Schmedding
 Lengerich of Westphalia, Germany
[21] Appl. No. 875,719
[22] Filed Nov. 12, 1969
[45] Patented Dec. 21, 1971
[73] Assignee Windmoller & Holscher
 Lengerich of Westphalia, Germany
[32] Priority Nov. 18, 1968
[33] Germany
[31] P 18 09 578.8

[54] PLASTICS SACKS PROVIDED WITH VENTING OR AERATING PERFORATIONS
12 Claims, 7 Drawing Figs.

[52] U.S. Cl..................................................... 229/55,
 150/1, 161/112, 229/DIG. 14
[51] Int. Cl........................................................ B65d 37/00,
 B32h 3/24
[50] Field of Search............................................ 229/55, 53,
 DIG. 14; 264/154; 150/1; 161/112

[56] References Cited
UNITED STATES PATENTS

| | | | |
|---|---|---|---|
| 2,545,243 | 3/1951 | Rumsey, Jr.................. | 229/DIG. 14 |
| 2,593,328 | 4/1952 | Meaker........................ | 229/DIG. 14 |
| 3,085,608 | 4/1963 | Mathues...................... | 229/DIG. 14 |
| 3,507,443 | 4/1970 | Gerard......................... | 229/55 |
| 3,092,439 | 6/1963 | Harrison...................... | 264/154 |

FOREIGN PATENTS

| 550,072 | 10/1956 | Belgium....................... | 229/DIG. 14 |
|---|---|---|---|

Primary Examiner—Leonard Summer
Attorney—Fleit, Gipple & Jacobson

ABSTRACT: A bag having walls comprising at least two plies of plastic sheet material, each ply having perforations which are offset from the perforations in the other ply, said perforations each having the form of a tapered nozzle with its tapered end directed in the desired direction of air passages therethrough, at least one of said plies resting on the tapered ends of the nozzles in the other ply, so as to provide a space between said two plies permitting the passage of air between the plies.

PATENTED DEC 21 1971 3,628,720

INVENTOR
Herbert SCHMEDDING
By
Fleit, Gipple & Jacobson
his ATTORNEYS

PLASTICS SACKS PROVIDED WITH VENTING OR AERATING PERFORATIONS

The invention relates to plastic sacks, bags or the like, hereinafter referred to as bags, provided with venting or aerating perforations.

Bags made from plastic foil material have come into widespread use because of their better properties compared with bags made of paper or textile material. In addition to having a considerable tensile strength and resistance to puncturing or piercing, they are absolutely watertight and they can be transparent, translucent, or colored, whichever may be desired. In particular, they are airtight but this property is not always of advantage for the contents with which the bags are filled. For example, for hygroscopic materials such as salts, fertilizers, cement and plaster, a hermetic seal will protect the contents from moisture in the air but for organic substances such as corn, flour, and fodder it prevents aeration which is necessary to protect these substances against mold and decay. Also, the property of airtightness is of disadvantage for materials which are aerated before the filling step to make them fluent and for materials which are filled pneumatically, especially pulverulent materials such as dyes, flour, plaster, and cement. This is because the air that reaches the interior of the bag during filling can be longer escape after the bag has been sealed. The bag then forms an elastic and flexible air cushion which is not easy to handle and stack.

It is known to provide single-ply plastic bags with holes of from 2 to 6 mm. diameter which are stamped into the bag walls. However, such through-going holes in the bag walls detract from one of the most important properties of the bag, namely watertightness, and restrict its use to coarse particulate or granular pourable contents which are not detrimentally affected by contact with moisture. The filling of such bags with pulverulent substances is practically impossible because even if the perforations were to be made much smaller, materials in powder form would readily escape from the bag.

The invention aims to provide a plastic bag which retains the above-mentioned beneficial properties but in which the contents can be vented or aerated as may be required.

According to the invention, there is provided a bag having walls comprising at least two plies of plastic foil, wherein each ply is provided with perforations which are offset from the perforations in the other ply and wherein the plies lie loosely on one another at the perforated areas. With this arrangement of perforations, one of the plies will cover the perforations in the other ply, and vice versa. This minimizes the penetration of water, for example precipitated water, into the bag and the escape of pourable material contained in the bag and yet air from outside the bag can reach the bag contents or air that was enclosed within the bag during pneumatic filling can escape from the bag through between the loosely superposed plies of foil at the places where the foils are perforated.

To avoid intimate contact between the foil plies and the location of the perforations which would constrict the desired path for air, the perforations are preferably formed by piercing the individual plies with pointed needles. This has the effect of producing at each perforation a turned-up irregular burr on the side of the ply where the piercing needle leaves the ply. These burrs tend to space the plies from one another at the perforations but their irregular edges leave sufficient room for air to pass to or from the space between the plies. The feature of staggering the perforations and the creation of a narrow space between the plies has the effect of forming a multitude of labyrinths which, although they permit the passage of air, will counteract any tendency of the bag contents to escape, even if they are pulverulent.

The disposition of the mutually offset perforations in the individual plies will be chosen according to the amount of venting or aeration that is desired. For example, intensive venting or aeration can be achieved if the perforations of the individual plies are distributed over the entire wall area of the bag. Alternatively, the perforations of the individual plies may be disposed over one or more longitudinal or transverse strip portions of the bag walls.

In general, the invention is applicable to most shapes of bags and irrespective of how the plies of the bag walls are interconnected (fusing or sticking). However, for making cross-bottom bags it is important that the open ends of the tube sections of the individual plies from which the bag is made be interconnected so that the plies in each bag are correctly juxtaposed. A suitable form of interconnection between the plies in any one bag can be brought about by an activating surface treatment of the plies, followed by pressing the plies together under heat. If the perforations are provided along strip portions of the bag walls in the case of cross-bottom bags, only the unperforated portions of the plies should be so treated so that the plies will not cling to one another along the perforated strip portions but lie loosely on one another.

When providing the perforations along longitudinal strips, it is advantageous to locate these strips adjacent side folds of the bag because when the bags are stacked there is less likelihood of the perforations being covered by superjacent and subjacent bags.

It has been found that the direction of piercing the perforations in each ply can be important because the flow of air seems to be easier in the same direction as the direction of piercing than oppositely. This is accounted for by the fact that each pierced perforation forms a small nozzle which is rounded off at the side of the ply where the needle enters, converges towards the exit side and has sharp edges at the exit. Consequently, the resistance to airflow in these nozzles is much less in the same direction as piercing than oppositely.

As a result of this discovery, a preferred direction of airflow can be brought about by appropriately choosing the direction in which the plies are penetrated, the choice depending on whether the bag contents are to be vented rather than aerated or aerated rather than vented or vented and aerated to a substantially equal degree. Thus, if the direction of piercing the perforations in both or all the plies for each bag is from outside the bag towards the interior, then the entry of external air for aerating the contents is enhanced. If both or all the plies for each bag are pierced in the other direction, i.e., from the interior toward the outside, the escape of air from the interior of the bag is enhanced for the purpose of rapid venting such as when the bag has been filled pneumatically. In this case the outwardly directed turned-up burrs in the outer ply provide the additional advantage of making the entry of moisture more difficult because at the apices of the burrs project beyond the wall surface on which there would be a film of water.

If the direction of piercing the perforations in adjacent plies is towards one another then, when air enters the space between the plies, it will be considerably throttled because the orifices of the burrs or nozzles formed during piercing one ply will be partially covered by the adjoining ply. Although this even further minimizes the likelihood of finely pulverulent materials escaping from the bag, it restricts the amount of air that can flow in or out. A large number of perforations is therefore necessary if intensive venting or aerating is required.

The arrangement of the perforations can also be such that the outer ply has its perforations pierced in a direction from the interior of the bag towards the outside and the inner ply has its perforations pierced in a direction from the outside of the bag towards the inside, the inner ply being also provided with outwardly directed perforations or with outwardly directed protrusions or pimples for spacing the plies from one another. This arrangement enhances a more active exchange of air but makes it more difficult for moisture to enter through the outer ply or the bag contents to escape through the inner ply.

Examples of the invention are illustrated in the accompanying diagrammatic drawings, wherein.

Figure 2:
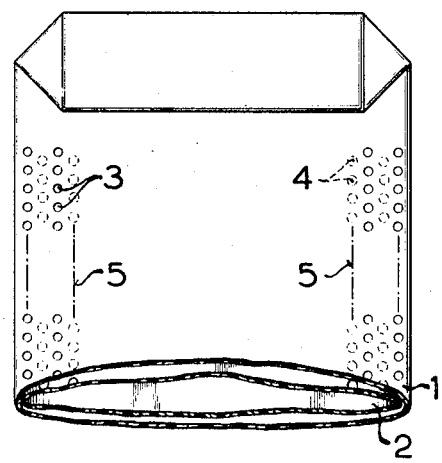
FIG. 2 is a similar view of a cross-bottom bag having the perforations arranged along transverse strips.
Figure 1:
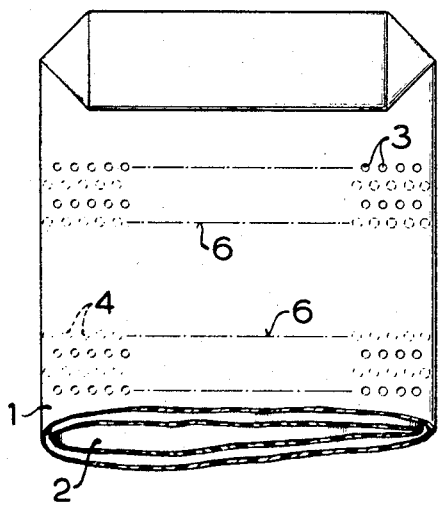
FIG. 1 is a fragmentary side elevation of a cross-bottom bag having the perforations arranged along longitudinal marginal strips.

The bags shown in FIGS. 1 and 2 comprise two plies of plastics foil, namely an outer ply 1 provided with perforations 3 and an inner ply 2 provided with perforations 4, the perforations being arranged in longitudinal marginal strips 5 in FIG. 1 and in transverse strips 6 in FIG. 2. For the purpose of illustration, the perforations are shown to an enlarged scale. It will be evident that the perforations 3 and 4 are offset from one another. Air coming form inside or outside the bag is therefore forced to follow a path that leads from one perforation, through between the two plies, to another perforation. For this reason, the two plies lie loosely on one another in the vicinity of the strips 5 and 6. Staggering of the perforations 3, 4 thus forms a labyrinth in which particles carried along by the air from the contents are held back or in which dust and humidity from the outside air are trapped, as the case may be.

The unperforated portions of ply material lying between the perforated strip portions 5, 6 can, before the plies are superposed, be subjected at their ultimately facing surfaces to an activating surface treatment, for example by high-frequency spark discharge, and, after superpositioning, to the influence of pressure and heat, whereby to achieve good adhesion between the plies at their unperforated areas.

The perforating and surface treatment of the plies can be carried out while they are still in the form of separate webs of foil and before they have been laid into tubular form.

Figure 7:
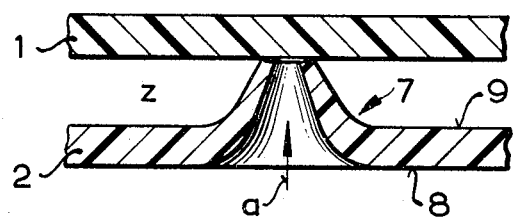
FIG. 7 is a still further enlarged fragmentary section showing details of one of the perforations.

The perforations are preferably produced by pointed needles which are pierced through the webs of foil. This gives rise to turned-up burrs or nozzles on the exit side of each foil at each perforation, as viewed in the direction in which the needle pierces the foil. One such burr or nozzle is shown at 7 in FIG. 7 for the ply 2 of foil material. These burrs or nozzles are important for the passage of air through the plies because they enable the quantity of air to be influenced.

Figures 3, 4:
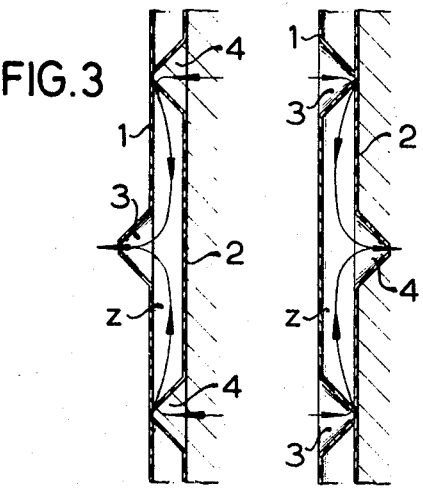
FIGS. 3 to 6 are fragmentary enlarged sectional views diagrammatically illustrating four different ways in which the perforations can be pierced.

Thus, referring to FIG. 3, the direction in which the plies 1 and 2 were pierced by needles to form perforations 3 and 4, respectively, was the same, namely from inside the bag towards the outside as viewed when the plies are superposed in the finished bag. This is indicated in FIG. 3 by the fact that the pierced perforations form substantially triangular nozzles in cross section having their apices directed towards the outside of the bag, the inside of the bag being indicated by crosshatching. The nozzles formed by turning up of the ply material around the perforations 4 extend into a space $z$ between the plies 1 and 2 and prevent the plies from making intimate contact with one another in the vicinity of the perforations. In other words, a space $z$ is maintained to permit the passage of air. As already mentioned, each of the perforations that is formed by piercing gives rise to a small nozzle 7 which, in the case of needles of circular cross section, has the shape shown in FIG. 7 to an enlarged scale. On the side 8 of the foil at which the piercing needle enters the ply 2, the nozzle orifice is rounded off and at the exit side 9 the orifice has a sharp and serrated edge because there the advancing needle point has torn the plastic material open and forced it aside. The serrated nozzle orifice permits a restricted flow of air into the space $z$ or out of same even if the adjacent ply 1 lies on the serrated orifice. Further, the nozzle 7 conically converges in the direction of the arrow $a$ because some of the turning up of the plastic material tends partially to revert to its undeformed state as a result of the elasticity of the material. In the FIG. 7 form of the nozzle, the resistance to airflow in the direction of the arrow $a$ is considerably less than in the opposite direction. The piercing direction employed for the FIG. 3 arrangement therefore enhances airflow from the bag interior in the direction of the arrows shown in FIG. 3, airflow in the opposite direction being more difficult. The FIG. 3 construction is therefore preferred for cases where the bag has been filled pneumatically because the air is given an opportunity to flow out uninterruptedly. The outer ply 1 which covers the mouths of the perforations 4 acts much the same as a nonreturn valve which uncovers the mouths when there is a higher pressure inside the bag but covers same when the outside pressure is higher. The entry of outside air is therefore minimized and the FIG. 3 arrangement is particularly suitable for bags filled with hygroscopic pourable material.

The outwardly directed turned-up portions of foil material surrounding the perforations 3 have the advantage that they minimize the entry of precipitated water such as rain or dew because the orifices or apices of the perforations lie beyond the general plane of the ply 1 and therefore beyond the film of water that would form along the ply 1.

In FIG. 4, the direction of piercing the perforations 3 and 4 in both the plies 1 and 2 was such that the nozzles are directed inwardly of the bag. Accordingly, the resistance to flow in the direction of the arrows in FIG. 4 towards the interior of the bag is much less than in the opposite direction. This arrangement is therefore particularly advantageous for bag contents which require aeration, the converging perforations 4 advantageously minimizing the possibility of the contents escaping.

Figure 5:
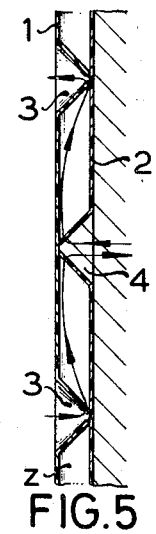

In FIG. 5, the perforations 3 and 4 are oppositely directed and were formed by needles piercing the respective plies in opposite directions. The turned-up portions or nozzles of both plies extend into the intermediate space $z$ between the plies and hold the plies at a spacing from one another. The resistance to airflow into the bag for aeration is the same as that to airflow out of the bag for venting purposes because in both cases the air must pass through a perforation in a flow-enhancing direction (see the arrow $a$ in FIG. 7) and through a perforation where the flow is not so favorable because it takes place in the opposite direction. A bag in accordance with FIG. 5 is therefore particularly advantageous for filling with pulverulent or pourable organic material such as corn, flour, or fodder which is introduced pneumatically and must be adequately aerated during storage.

Figure 6:
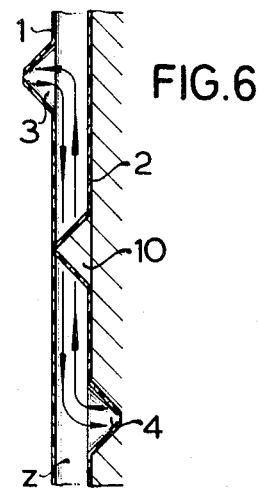

The FIG. 6 construction provides for outwardly directed perforations 3 in the ply 1 and inwardly directed perforations 4 in the inner ply 2. The ply 2 also contains outwardly directed perforations 10 which merely serve to maintain the space $z$ between the plies. Consequently, the perforations 10 may be replaced by protrusions or pimples which are pressed into the material of the ply 2 without actually piercing same, for example with the aid of blunt needles. In the same way as in FIG. 5, the FIG. 6 construction also exhibits the same resistance to the flow of air into the bag as to the flow of air out of the bag. In contrast with FIG. 5, however, the amount of air that can pass is considerably greater because the orifices of the perforations 3, 4 are not covered by the adjacent ply. In addition, the outwardly directed perforations 3 provide better protection against the entry of moisture while the inwardly directed perforations 4 make the escape of the bag contents more difficult.

In all the construction the amount of airflow is determined by the number and cross-sectional size of the perforations, the cross-sectional size being in turn governed by the coarseness or fineness of the intended bag contents. In the preferred form of the invention, the diameter of the perforations is between 0.5 and 1.5 mm.

I claim:

1. A bag having walls comprising at least two plies of plastic sheet material, each ply including a plurality of tapered nozzles defining perforations to form air passages therethrough, the tapered end of each nozzle being directed in the desired direction of air passage, said ply perforations being offset from the perforations in the other ply and at least one of said plies resting on the tapered ends of said tapered nozzles in the other ply to provide space between said two plies permitting the passage of air between said plies.

2. A bag according to claim 1, wherein the perforations have been formed by piercing the individual plies with pointed needles.

3. A bag according to claim 2, wherein the direction of piercing the perforations in both or all plies is form outside the bag towards the interior.

4. A bag according to claim 2, wherein the direction of piercing the perforations in both or all plies is from the interior of the bag towards the outside.

5. A bag according to claim 2, wherein the direction of piercing the perforations is towards one another in adjacent plies.

6. A two-ply bag according to claim 2, wherein the outer ply has its perforations pierced in a direction from the interior of the bag towards the outside and the inner ply has perforations pierced in both directions.

7. A two-ply bag according to claim 2, wherein the outer ply has its perforations pierced in a direction from the interior of the bag towards the outside and the inner ply has its perforations pierced in a direction from the outside of the bag towards the inside, the inner ply being also provided with outwardly directed protuberances or pimples.

8. A bag according to claim 1, wherein the perforations of the individual plies are distributed over the entire wall area of the bag.

9. A bag according to claim 1, wherein the perforations of the individual plies are disposed over one or more longitudinal strip portions of the bag walls.

10. A bag according to claim 9, wherein the perforated longitudinal strip portions are located adjacent side folds of the bag.

11. A bag according to claim 1, wherein the perforations of the individual plies are disposed over one or more transverse strip portions of the bag walls.

12. A bag according to claim 1, wherein the unperforated portions of the plies have been subjected to an activating surface treatment so that, other than along the perforated strip portions, the plies cling to one another.

* * * * *